July 28, 1936.  J. M. CHARLTON  2,049,104
WING NUT
Filed April 29, 1935
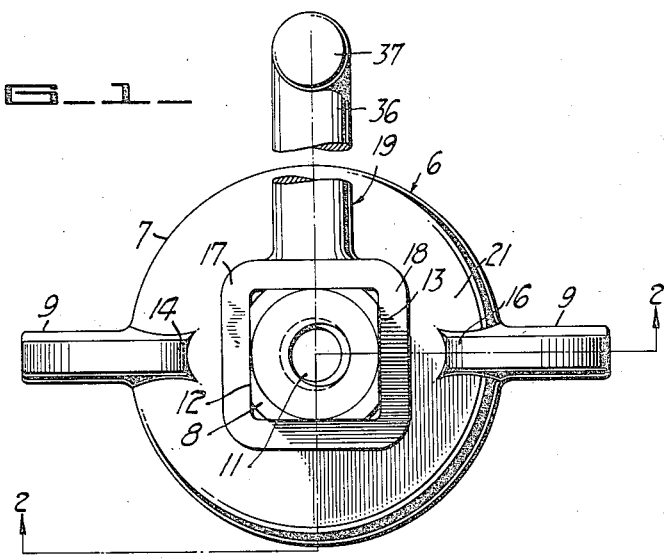
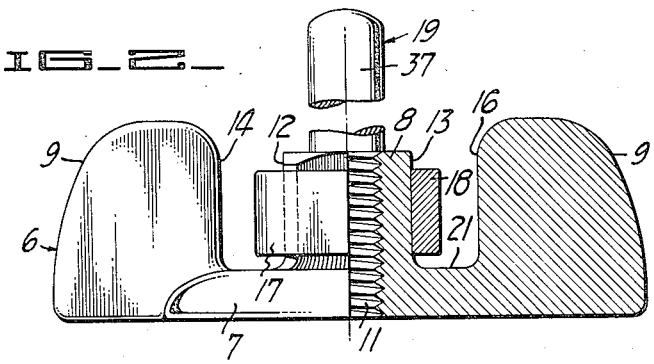
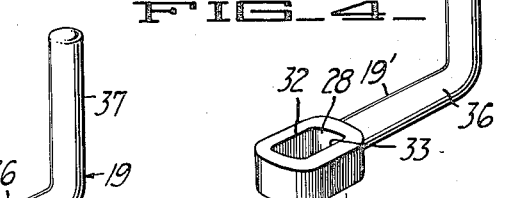
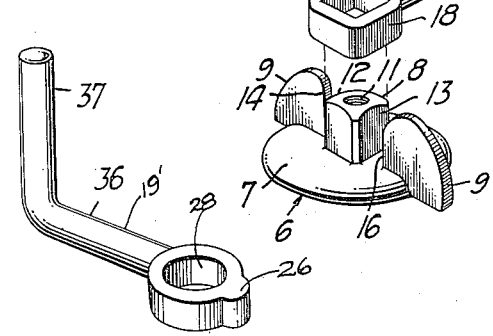
INVENTOR.
John M. Charlton
BY Joseph B. Gardner
his ATTORNEY Patented July 28, 1936

2,049,104

UNITED STATES PATENT OFFICE 2,049,104

WING NUT

John M. Charlton, Oakland, Calif., assignor to R. A. Simpson Manufacturing Company, Inc., Oakland, Calif., a corporation of California Application April 29, 1935, Serial No. 18,764

6 Claims. (Cl. 85—32)

The invention relates to bolt nuts and more particularly to the class known as wing or thumb nuts.

As is well known, wing or thumb nuts have found a wide usage in devices where a manual releasable tightening of various parts is required and where but a relatively small tightening force need be effected. Since these nuts are very convenient to use in that they may be quickly rotated over the threads of a bolt or the like to and from a tightening position, there is a tendency to use these nuts even when a greater tightening force is required than is available by the grasping of the nut directly in the hand of the user. Thus, frequently the user will attempt to grip the wing portions of the nut in a wrench in order to obtain an increased leverage for tightening. In such instances, and also where the nut has been subjected to tightening pressure for a considerable length of time, it is practically necessary to use a wrench or similar means for starting the release of the nut. Frequently for both the tightening and loosening operation, a mere bar or the like is inserted between the wing portions of the nut to obtain greater turning leverage. As will be understood, the wing portions of the nut are formed for gripping between the thumb and finger of the hand, and are wholly unsuited in form and positioning, as well as in strength, for engagement in a standard wrench or with a bar of the character described. As a result, attempts to apply a relatively large tightening or releasing pressure to these wing nuts frequently result in the fracture and breaking off of the wing portions of the nut. In accordance with the present invention, and as a principal object thereof, I provide a wing nut which not only affords the usual wing portions for grasping in the hand, but is further especially arranged for proper engagement with a wrench.

Another object of the invention is to provide a wing nut of the character described having a polygonal sided hub portion so arranged and positioned with respect to the wing portions of the nut aforesaid as to enable the ready grasping of such hub in a wrench.

A further object of the invention is to provide an improved form of wrench for use with the wing nut of my invention.

Still another object of the invention is to provide a wing nut of the character described which may be formed in the usual manner without substantially any increase in the cost of manufacture over the ordinary wing nut heretofore used.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a plan view of a wing nut constructed in accordance with my invention and shown with a wrench in operative engagement therewith.

Figure 2 is a side elevation shown half in section of the wing nut illustrated in Figure 1, and is taken substantially on the plane of line 2—2 of Figure 1.

Figure 3 is a perspective view of the wing nut and the wrench aforesaid.

Figure 4 is a perspective view of a modified form of a wing nut and wrench therefor.

Figure 5 is a perspective view of a modified form of wrench for engagement with the wing nut shown in Figure 4.

The nut 6 of my invention, and as shown particularly in Figures 1 to 3 of the accompanying drawing, comprises a circular disc shaped body 7 provided with an outstanding axial extending hub portion 8 and a pair of wing portions 9 formed integrally with said body at opposite sides of said hub. The wing portions are of more or less customary design and extend both axially and radially from the body for ready grasping between the thumb and finger of the hand. The hub portion, on the other hand, is formed of a polygonal sided section for engagement with a wrench and is provided with a threaded axially extending bore 11 which also extends through the body for connection to the threaded end of a bolt or the like. If desired, the body and wing and hub portions may be cast as a single piece, and when so constructed produce a unit which is substantially as simple and inexpensive of manufacture as the ordinary wing nut.

Preferably the hub and wing portions are spaced from each other a distance sufficient to permit the entry therebetween of a wrench for engagement with the sides of the hub. As may be best seen from Figures 1 and 2, the sides 12 and 13 of the hub are spaced from the adjacent inner ends 14 and 16 of the wing portions to receive in the spaces therebetween the sides 17 and 18 of the socket wrench 19. As will be understood, the opposed sides of the hub and wings may, as here shown, be spaced over their full length as by extending these portions in spaced relation to the outer side 21 of the body or the same may be extended in spaced relation a shorter distance but sufficient to provide a full engagement of the hub with the wrench.

It will now be clear that since the wing portions are normally grasped at the extreme outer sides of the nut while the wrench is most conveniently applied to the central portion of the nut, the nut of the present invention is well adapted for turning either directly by hand or with a wrench and that each the wing and hub portions are so arranged with respect to the other as to permit each to function most effectively.

In Figures 4 and 5 of the drawing I have illustrated a modified form of the nut and wrench combination wherein the hub 8' serves as a centering means for the wrench 19' and the latter, as illustrated in Figure 5, is provided with an offset portion 26 for engagement with one of the wings 9' of the nut. This wrench is provided with a circular center opening 28 which is arranged to fit over the hub portion 8' and thereby center the wrench on the nut and cause a properly directed force to be applied to the nut wing. If desired, and as here shown, the portion 26 may be positioned in diametrically opposed relation to the handle 36 of the wrench so that on rotation of the wrench to engage the portion 26 with one of the wing portions of the nut the handle will be brought into engagement with the other wing. In this manner, each of the wings will be equally stressed on turning the nut and substantially all likelihood of fracturing one of the wings when but a reasonable force is applied will be eliminated.

As will be clear from Figure 4, the hub 8' of the nut is provided in addition to the circular sides 39 and 41 for rotatably engaging the circular sides of the wrench shown in Figure 5, with a pair of flattened sides 29 and 31 which are arranged to engage with the parallel sides 32 and 33 of the wrench shown in Figure 4. Thus, the wing nut disclosed in this embodiment is readily adaptable for use with the type of wrench shown in Figure 4 which applies the turning force to the hub of the nut, or the same may be equally well adapted to the form of wrench shown in Figure 5 wherein the turning force is applied to the wings of the nut.

Preferably the handles 36 of the wrenches shown in both the embodiments of the present invention are provided with a crank or laterally offset portion 37 so as to permit grasping for quickly rotating the nut to and from a fastening positioning on a bolt or the like.

I claim:

1. In a nut of the character described, a body portion, wing portions on said body portion extending transversely from opposite sides thereof, and a hub portion on said body intermediate said wing portions for engagement with and for centering a wrench on said nut and having a threaded bore axially therethrough and through said body portion.

2. In a nut of the character described, a body portion, a polygonal sided hub thereon extending from an intermediate portion thereof and provided centrally therethrough and through said body portion with a threaded bore, and wing portions on said body portion at opposite sides of said hub.

3. In a nut of the character described, a disc shaped body, wing portions on said body extending transversely from opposite sides thereof, and a polygonal sided hub portion on said body and intermediate said wing portions for engagement by a wrench and having a threaded bore axially therethrough and through said body.

4. In a nut of the character described, a disc shaped body, wing portions on said body extending transversely from opposite sides thereof, and a polygonal sided hub portion on said body and intermediate said wing portions and having sides thereof spaced from said wing portions for engagement by a wrench and having a threaded bore axially therethrough and through said body.

5. In a nut of the character described, a body portion, a polygonal sided hub thereon extending from an intermediate portion thereof and provided centrally therethrough and through said body portion with a threaded bore, and wing portions on said body portions and spaced from said hub a distance permitting the insertion of a wrench side therebetween.

6. In a nut of the character described, a disc shaped body, a polygonal sided hub portion formed thereon and extending axially from a side thereof and provided axially therethrough and through said body with a threaded bore arranged for engagement with the threaded end of a bolt or the like, and a pair of wing portions on said body on opposite sides of said hub and spaced therefrom a distance permitting the entry of a wrench side therebetween.

JOHN M. CHARLTON.